(12) United States Patent
Cheung et al.

(10) Patent No.: US 6,812,598 B2
(45) Date of Patent: Nov. 2, 2004

(54) MULTIPLE MAGNET TRANSDUCER WITH DIFFERENTIAL MAGNETIC STRENGTHS

(75) Inventors: Jeffrey T. Cheung, Thousand Oaks, CA (US); Hao Xin, Sherman Oaks, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 305 days.

(21) Appl. No.: 10/078,176

(22) Filed: Feb. 19, 2002

(65) Prior Publication Data

US 2003/0155828 A1 Aug. 21, 2003

(51) Int. Cl.$^7$ ............................................. H02K 35/02
(52) U.S. Cl. ......................... 310/30; 310/17; 290/1 R; 322/3
(58) Field of Search ............................ 310/12–15, 17, 310/19, 28, 30; 290/1 R, 42, 43, 53, 54; 322/1, 3

(56) References Cited

U.S. PATENT DOCUMENTS

| | | | |
|---|---|---|---|
| 3,083,469 A | 4/1963 | Herbst | 33/215 |
| 3,554,617 A | 1/1971 | Weaver | 308/3 |
| 3,726,574 A | 4/1973 | Tuffias et al. | 308/36.3 |
| 3,746,407 A | 7/1973 | Stiles et al. | 308/36.3 |
| 3,834,775 A | 9/1974 | Tuffias et al. | 308/36.3 |
| 3,977,739 A | 8/1976 | Moskowitz et al. | 308/187 |
| 4,064,409 A | 12/1977 | Redman | 310/306 |
| 4,171,818 A | 10/1979 | Moskowitz et al. | 277/80 |
| 4,260,901 A | 4/1981 | Woodbridge | 290/42 |
| 4,356,098 A | 10/1982 | Chagnon | 252/62.51 |
| 4,357,024 A | 11/1982 | Raj | 277/1 |
| 4,430,239 A | 2/1984 | Wyman | 252/62.51 |
| 4,485,024 A | 11/1984 | Furumura et al. | 252/62.56 |
| 4,673,997 A | 6/1987 | Gowda et al. | 360/107 |
| 4,687,596 A | 8/1987 | Borduz et al. | 252/510 |
| 4,706,498 A | 11/1987 | Nemnich et al. | 73/516 |
| 4,732,706 A | 3/1988 | Borduz et al. | 252/510 |

(List continued on next page.)

FOREIGN PATENT DOCUMENTS

| | | | | |
|---|---|---|---|---|
| DE | 3841011 A | 6/1990 | | H02K/51/00 |
| DE | 19810211 A | 9/1999 | | |

(List continued on next page.)

OTHER PUBLICATIONS

Patent Abstracts of Japan, vol. 013, No. 014 (M–784), Jan. 13, 1989, –& JP 63 225718 A (Hitachi Electronics Eng Co Ltd), Sep. 20, 1988 abstract.

(List continued on next page.)

*Primary Examiner*—Burton S. Mullins
*Assistant Examiner*—Judson H. Jones
(74) *Attorney, Agent, or Firm*—Koppel, Jacobs, Patrick & Heybl

(57) ABSTRACT

A dynamic magnet system, particularly useful for electrical generation, employs multiple magnets in polar opposition to each other for individual movement relative to a support structure. The magnets have a critical angle of displacement from a horizontal static position of less than 1 degree, with at least some of the magnets having mutually different properties. With different magnetic strengths, a greater movement is produced for both magnets in response to movements of the support structure, for particular ranges of magnetic strength ratios, than would be the case with equal magnets. The magnet movement can be translated into an electrical signal to power an operating system. Ultra low friction ferrofluid bearings can be used to establish static coefficients of friction between the magnets and support structure less than 0.02, enabling useful power generation from only slight movements of the support structure.

60 Claims, 3 Drawing Sheets

U.S. PATENT DOCUMENTS

| | | | |
|---|---|---|---|
| 4,734,606 A | 3/1988 | Hajec | 310/90.5 |
| 4,749,921 A * | 6/1988 | Chitayat | 318/135 |
| 4,797,013 A | 1/1989 | Raj et al. | 384/462 |
| 4,814,654 A | 3/1989 | Gerfast | 310/154.28 |
| 4,898,480 A | 2/1990 | Raj et al. | 384/446 |
| 4,938,886 A | 7/1990 | Lindsten et al. | 252/62.51 |
| 4,965,864 A | 10/1990 | Roth et al. | 318/135 |
| 5,085,789 A | 2/1992 | Yokouchi et al. | 252/62.52 |
| 5,175,457 A | 12/1992 | Vincent | 310/15 |
| 5,323,076 A | 6/1994 | Hajec | 310/90 |
| 5,347,186 A | 9/1994 | Konotchick | 310/17 |
| 5,358,648 A | 10/1994 | Chakravarti | 252/8.6 |
| 5,376,862 A | 12/1994 | Stevens | 310/75 |
| 5,417,507 A | 5/1995 | Uno et al. | 384/107 |
| 5,444,313 A | 8/1995 | Oudet | 310/17 |
| 5,452,520 A | 9/1995 | Raj et al. | 33/366 |
| 5,490,425 A | 2/1996 | Raj et al. | 73/745 |
| 5,578,877 A | 11/1996 | Tiemann | 310/15 |
| 5,713,670 A | 2/1998 | Goldowsky | 384/115 |
| 5,775,169 A | 7/1998 | Solomon et al. | 74/490.01 |
| 5,780,741 A | 7/1998 | Raj | 73/514.08 |
| 5,818,132 A | 10/1998 | Konotchick | 310/17 |
| 5,899,220 A | 5/1999 | Alcocer et al. | 137/13 |
| 5,908,987 A | 6/1999 | Raj | 73/514.09 |
| 6,020,664 A | 2/2000 | Liu et al. | 310/90 |
| 6,056,889 A | 5/2000 | Tsuda et al. | 252/62.52 |
| 6,083,082 A | 7/2000 | Saldana | 451/5 |
| 6,104,108 A * | 8/2000 | Hazelton et al. | 310/12 |
| 6,208,743 B1 | 3/2001 | Marten et al. | 381/415 |
| 6,220,719 B1 | 4/2001 | Vetorino et al. | 362/192 |
| 6,254,781 B1 | 7/2001 | Raj | 210/695 |
| 6,261,471 B1 | 7/2001 | Tsuda et al. | 252/62.52 |
| 6,277,298 B1 | 8/2001 | Borduz et al. | 252/62.52 |
| 6,313,551 B1 | 11/2001 | Hazelton | 310/12 |
| 6,501,357 B2 | 12/2002 | Petro | 335/229 |
| 6,570,273 B2 | 5/2003 | Hazelton | 310/12 |

FOREIGN PATENT DOCUMENTS

| | | | |
|---|---|---|---|
| DE | 2011395 U1 | 1/2002 | H04M/1/21 |
| EP | 206516 A2 | 12/1986 | H01F/1/28 |
| FR | 2407599 A | 5/1979 | H02K/35/02 |
| GB | 1504872 A | 3/1974 | F16C/29/02 |
| JP | 2001258234 A | 9/2001 | H02K/35/04 |

OTHER PUBLICATIONS

Patent Abstracts of Japan, vol. 007, No. 012 (M–186), Jan. 19, 1983, –& JP 57 171117 A (Fuji Xerox KK ), Oct. 21, 1982 abstract.

Patent Abstracts of Japan, vol. 002, No. 044 (M–013), Mar. 24, 1978, –&JP 53 002865 A (Inque Japax Res Inc), Jan. 12, 1978 figure 1.

Electric Motors and Motor Controls; Jeff Keljik; 1995; Delmar Publishers; pp. 139–142, month unknown.

Patent Abstracts of Japan, vol. 2000, No. 14, Mar. 5, 2001 & JP 2000 308327 A (Makino Tadashi Kenkyusho:KK), Nov. 2, 2000 abstract.

Patent Abstracts of Japan, vol. 2000, No. 26, Jul. 1, 2002 –& JP 2001 258234 A (NTT ME Kansai Corp), Sep. 21, 2001 abstract, 'Inertial Generation Equipment and Communication System', Kurokawa Naoyuki.

Calin Popa N et al: "Gravitational electrical generator on magnetic fluid cushion", Journal of Magnetism and Magnetic Materials, Elsevier Science Publishers, Amsterdam, NL, vol. 201, NR. 1–3, pp.(s) 407–409 XP004181287, ISSN: 0304–8853, p. 408, column 1, line 1–3, figures 1,2 Received May 25, 1998; received form in revised Sep. 21, 1998.

* cited by examiner

MULTIPLE MAGNET TRANSDUCER WITH DIFFERENTIAL MAGNETIC STRENGTHS

BACKGROUND OF THE INVENTION

1. Field of the Invention

This invention relates to dynamic magnet systems, and more particularly to multiple-magnet systems used to generate electric power.

2. Description of the Related Art

Moving a magnet through a conductive coil induces a current flow in the coil. If the magnet is moved back and forth in a reciprocating motion, the direction of current flow in the coil will be reversed for each successive traverse, yielding an AC current.

Several electrical generating systems have been disclosed that make use of reciprocating magnet movement through one or more coils. For example, in various embodiments of U.S. Pat. No. 5,347,185, one, two or three rare earth magnets are positioned to move linearly back and forth relative to one or more coils. The magnets can either be fixed and the coil moved up and down relative to the magnet, as by wave action, the coil can be fixed and the magnet moved relative to the coil as by pneumatic pressure, or the coil housing can be shaken or vibrated as by being carried by a jogger, to cause a reciprocating or oscillating motion of a magnet which moves within the coil. In one embodiment four magnets are provided in successive polar opposition, with the two end magnets fixed and the middle magnets free to move back and forth along respective portions of a tube. The two middle magnets are separated from each other by the carrier for a middle coil, the carrier being approximately twice as wide as either of the middle magnets.

In U.S. Pat. No. 5,818,132, one embodiment discloses three moving magnets that are suspended within a vertical tube in polar opposition to each other and to end magnets, with a number of coils spaced along the outside of the tube. To minimize friction between the moving magnets and the tube, the tube is oriented vertically and moved up and down to move the magnets relative to the coils, thus generating currents in the coils. However, the vertical orientation interferes with the motion of the magnets, which have to fight gravitational forces in order to move relative to the tube. The coupling of tube movements into the magnets is thus reduced.

SUMMARY OF THE INVENTION

The present invention provides a dynamic multiple magnet system which achieves a greater coupling between a support structure for the magnets and the motion imparted to the magnets themselves. This enables a greater electrical output for a given device size and weight, and also allows the magnets to be oriented for movement in a primarily horizontal direction, thus greatly increasing their sensitivity to applied motion.

These improvements are achieved by orienting a plurality of magnets in polar opposition for individual movement relative to a support structure, with at least some of the magnets having mutually different properties. The magnets can have different magnetic strengths, achieved by various means such as providing the magnets with different magnetizations or sizes. Equal size magnets having different degrees of magnetization, different sized magnets with equal unit degrees of magnetization, or blendings of the two can be used. Surprisingly, the magnet responses to an applied movement of their support structure are greater than for two equal magnets having the average of their sizes and strengths over specific magnetic strength ratios.

The magnets are preferably provided with ultra low friction ferrofluid bearings which establish static coefficients of friction between the magnets and support structure less than 0.02. The ferrofluid preferably has a viscosity less than 10 centipoise, and in a particular embodiment comprises a light mineral oil medium mixed with isoparaffinic acid.

The provision of ultra low friction bearings permits the magnets to be disposed in a generally horizontal orientation, at which their sensitivity to applied forces on the support structure is significantly enhanced. With this orientation the magnets exhibit multiple oscillation modes that effectively couple many different movements of the support structure into useful magnet motion. With one or more conductive coils positioned to have their turns cut by the moving magnetic fields, an electrical signal can be generated to power numerous kinds of operating systems. The critical angle of displacement for the magnets from a horizontal static position is preferably less than 1 degree, and can be less than 10 minutes with an appropriate choice of ferrofluid bearings.

These and other features and advantages of the invention will be apparent to those skilled in the art from the following detailed description, taken together with the accompanying drawings.

DETAILED DESCRIPTION OF THE INVENTION

The present invention provides for more effective and flexible electrical power generation than has previously been available in reciprocating or oscillating magnet systems. Electricity can be effectively generated from very slight movements of the magnet support structure off a horizontal plane and/or movements in a horizontal plane. For example, a walking motion or other normal motions such as turning, tapping, bowing, or even riding in a vehicle that is subject to vibration, can easily generate useful amounts of electricity when the support structure for the magnets is held in the user's hand or in a shirt pocket, while slight off-horizontal movements due to wave or wind action can also be used for electrical generation.

The invention employs multiple magnets that move relative to a common support structure. It is not restricted to the three magnets required for the multi-magnet system of U.S. Pat. No. 5,181,132, but rather can employ virtually any number of magnets, including even numbers. The requirement for a vertical orientation for the multi-magnet system of U.S. Pat. No. 5,181,132 is also eliminated, allowing for a horizontal magnet motion that is much more sensitive to support structure movements.

Figure 1:
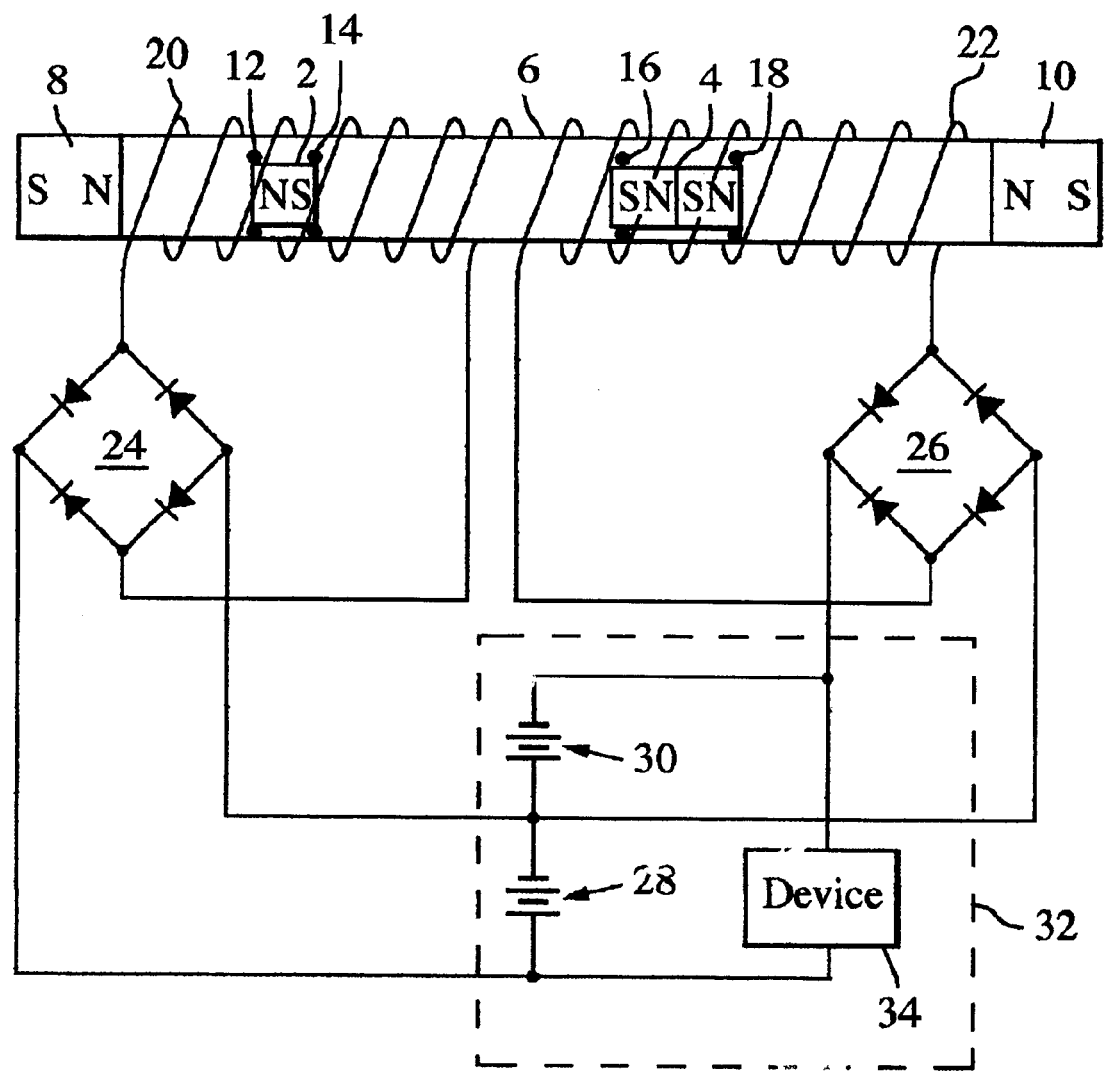
FIG. 1 is a schematic diagram illustrating the use of a two magnet embodiment of the invention to provide power for an operating system.

FIG. 1 illustrates the use of the invention to provide power for an operating system. In this embodiment two moving magnets 2 and 4 move along the axis of a support structure in the form of a tubular non-magnetic enclosure 6. The magnets are in polar opposition to each other, with their facing ends of like magnetic polarity. Thus, the magnets mutually repel each other when they come into proximity. Fixed magnets 8 and 10 are positioned at opposite ends of the enclosure in polar opposition to their nearest respective moving magnets 2 and 4. The ends of the moving and end magnets which face each other are also of like magnetic polarity so that the adjacent magnets repel each other.

Magnet 2 is illustrated as having a unit size, while magnet 4 is illustrated as comprising two unit sizes. Since all of the magnet units are assumed in this embodiment to have equal magnetic strengths, the overall magnetic strength of magnet 4 will be twice that of magnet 2. For slight impacts to the enclosure or slight off-horizontal enclosure movements, the magnets 2 and 4 will slide along the enclosure 6 if the static coefficients of friction between the magnets and the enclosure are less than about 0.02. Magnet movement will generally not occur with higher frictional coefficients in response to relatively gentle enclosure movements, such as those produced by placing the enclosure in a shirt pocket and walking with it. The use of two magnets in polar opposition to each other with ultra low friction bearings has been found to greatly increase the responsiveness of magnet motion to enclosure movements that are not at the natural frequency of the enclosure with a single magnet, and/or are out of phase with the initial magnet motion. Surprisingly, it has been discovered that, when the two magnets have different magnetic strengths, both magnets have a greater response to enclosure movements than do two equal magnets of intermediate magnetic strength. In other words, starting with two magnets of equal magnetic strength, increasing the strength of one and reducing the strength of the other will cause both magnets to oscillate faster in response to enclosure movements for particular ranges of strength ratios. This greater responsiveness directly increases the amount of power that can be generated with the system.

To achieve the desired low level of friction, ferrofluid bearings are preferably employed as an interface between the magnets and enclosure. Ferrofluids are dispersions of finely divided magnetic or magnetizable particles, generally ranging between about 30 and 150 Angstroms in size, and dispersed in a liquid carrier. The magnetic particles are typically covered with surfactants or a dispersing agent. The surfactants assure a permanent distance between the magnet particles to overcome the forces of attraction caused by Van der Waal forces and magnetic interaction, and also provide a chemical composition on the outer layer of the covered particles which is compatible with the liquid carrier and the chemicals in the surrounding environment. Ferrites and ferric oxides employed as magnet particles offer a number of physical and chemical properties to the ferrofluid, including saturation magnetization, viscosity, magnetic stability and chemical stability. Several types of ferrofluids are provided by Ferrotec (USA) Corporation of Nashua, N.H. A summary of patents related to the preparation of ferrofluids is provided in U.S. Pat. No. 6,056,889, while the use of ferrofluid bearings in a moving magnet electrical generator is discussed in copending patent application Ser. No. 10/078,724, entitled "Electrical Generator With Ferrofluid Bearings", filed on the same day as the present invention by the present applicants and also assigned to Innovative Technology Licensing, LLC, the assignee of the present invention. The contents of this copending application are hereby incorporated herein by reference.

The characteristics of the ferrofluid and magnets are related. If the magnets have a relatively low magnetic field, a ferrofluid of relatively high magnetization should be used. The magnets' magnetic fields will typically range from about 500–4000 Gauss, and the magnetization of the ferrofluid from about 50–400 Gauss.

The ferrofluid's frictional coefficient is roughly related to its viscosity (measured in centipoise (cp)), but not directly. For example, a ferrofluid with a viscosity of 300 cp has been found to have a static friction coefficient of about 0.015, the EFH1 ferrofluid from Ferrotec (USA) Corporation has a viscosity on the order of 6 cp and a static friction coefficient of about 0.002, but a water based ferrofluid with a viscosity of 5 cp has been found to have a static friction coefficient of about 0.01. The higher friction coefficient for the somewhat lower viscosity composition has been attributed to a surface tension associated with a water based solvent.

A preferred ferrofluid composition for the present invention has a viscosity substantially less than 5 cp, actually less than 2 cp, and achieves an ultra low coefficient of static friction in the range of 0.0008–0.0012. This is sensitive enough for a magnet on a beam to begin sliding when the beam is tilted only about 0.07 degrees off horizontal. This and other suitable ferrofluid compositions are discussed in copending patent application Ser. No. 10/078,132, entitled "Mechanical Translator With Ultra Low Friction Ferrofluid Bearings", filed on the same day as the present invention by applicant Jeffrey T. Cheung, and also assigned to Innovative Technology Licensing, LLC, the contents of which application are hereby incorporated herein by reference. The composition comprises a mixture of one part Ferrotec (USA) Corporation EFH1 light mineral oil ferrofluid mixed with from two to four parts of isoparaffinic acid, stirred for 24 hours. Suitable sources of isoparaffinic acid are Isopar G and Isopar M hydrocarbon fluids from ExxonMobil Chemical Corp.

Undiluted EFH1 ferrofluid could also be used. Undiluted EFH1 composition has a greater weight bearing capacity than for the diluted version, but diluting the composition will retain sufficient weight bearing capability for most applications. Other ferrofluids with static friction coefficients up to about 0.02 could also be used, such as Ferrotec (USA) Corporation type EMG805, a water based ferrofluid with a static friction coefficient of about 0.01 and a viscosity of about 5 cp, since the power output achievable with a 0.02 static friction coefficient is still about 75% that achievable with a zero friction system. At present the EMG805 composition is considerably more expensive than the EFH1 composition and has a somewhat lesser load bearing capability. In general, suitable ferrofluids will yield a critical angle of displacement from a horizontal static position of less than 1 degree to initiate magnet movement, and with the mixture described about the critical angle is less than 10 minutes.

Returning to FIG. 1, a ferrofluid within the enclosure 6 is naturally attracted to the poles of magnets 2 and 4 to form beads 12, 14 and 16, 18 around the end poles of magnets 2 and 4, respectively. This provides an ultra low friction lubricant that allows the magnets to freely slide with respect to the enclosure. The magnets will move in response to a tilting of the enclosure away from horizontal, a horizontal movement of the enclosure, or more complex compound movements. The kinetic energy of the moving magnets is converted to potential energy as they approach their respective end magnets, and then back to kinetic energy as they are repelled away from the end magnets.

A pair of conductive coils 20 and 22 are wound on respective halves of the enclosure 6. Alternately, a single coil encompassing the full length of magnet movement within the enclosure could employed but, since the two magnets will often be moving in opposite directions, opposing currents would be induced in a single coil during these periods that would lower the system's overall efficiency.

Coils 20 and 22 are connected to respective full-wave bridge rectifying circuits 24 and 26, the outputs of which charge batteries 28 and 30, respectively, within an overall operating system 32. The batteries provide power for an operating device 34, such as an environmental sensor, transmitter, flashlight or cellular telephone, that can be operated by mechanical inputs such as a walking motion, wave motion or wind. Alternately, the bridge outputs can be connected directly to the operating device if real time power is desired.

Figure 2:
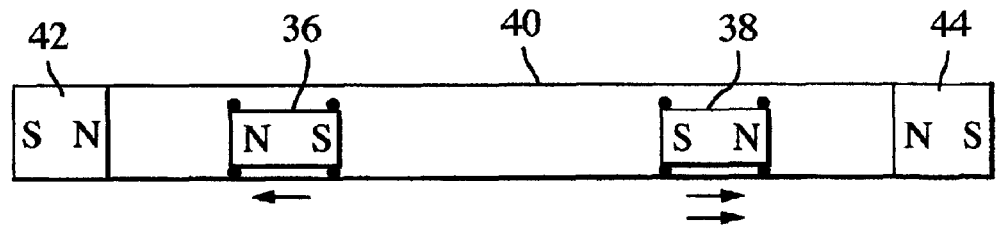
FIG. 2 is a schematic diagram of a two-magnet embodiment with equal sized magnets having different magnetization.

FIG. 2 illustrates an alternate embodiment of the invention, with just the magnets and their enclosure shown for purposes of simplification, without coils or other circuitry. In this embodiment a pair of magnets 36, 38 are again retained within a nonmagnetic enclosure 40 by end magnets 42, 44 of opposing polarities. In this case the magnets are of equal size, but magnet 38 has a greater degree of magnetization and magnetic field strength, as indicated by double magnetization arrows, as opposed to a single magnetization arrow for magnet 36. The operation of this type of arrangement is generally equivalent to that shown in FIG. 1, in which each of the magnet sections have equal unit field strengths, with one magnet having two sections and the other having one. In both cases, both magnets will move faster in response to movements of the enclosure, for particular ranges of size and strength ratios, than would be the case with two magnets both having a field strength equal to the stronger magnet of FIG. 2.

Figure 3:
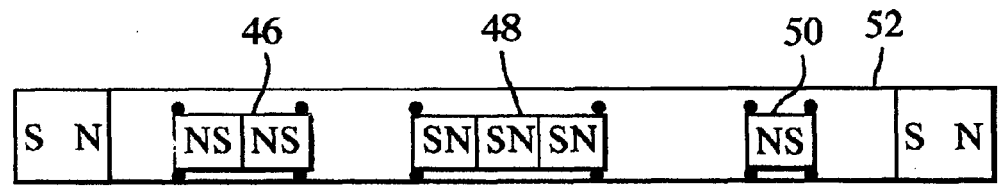
FIG. 3 is a schematic diagram of a three-magnet embodiment of the invention.

FIG. 3 illustrates a further embodiment with three magnets 46, 48 and 50 within enclosure 52. In this example the magnets all have different sizes/magnetic field strengths, with each riding on ultra low friction ferrofluid bearings. The largest magnet is shown disposed between the other two, but this order could be varied, as could the ratios between the magnet sizes/field strengths, within the scope of the invention. Two of the magnets could also be made equal, with the third magnet having a different field strength. The invention can be generalized to any plural number of magnets, with at least two having different magnetic strengths, although increasing the number of magnets reduces the effective length of the enclosure left for magnet movement.

Figure 4:
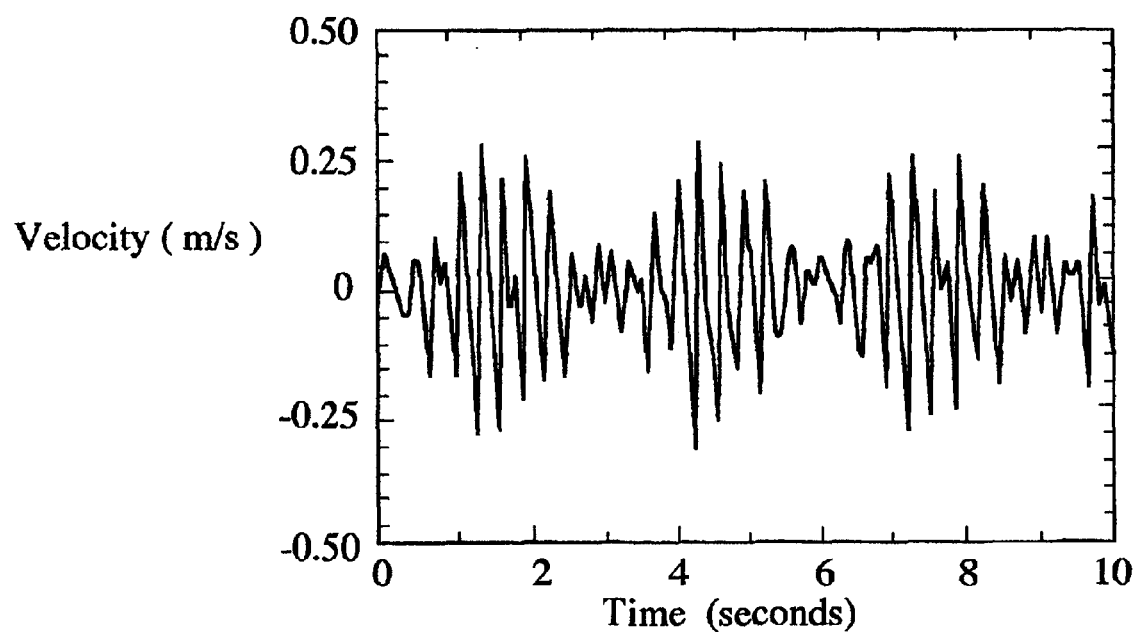
FIG. 4 is a calculated plot of magnet velocity as a function of time for a two-magnet system with equal magnets.

FIG. 4 is a calculated plot illustrating the multiple modes of vibration that result from a plural magnet system with ultra low friction bearings. This plot was made with the magnets assumed to have equal magnetic field strengths, and traces the velocity of one of the magnets as a function of time. The enclosure is assumed to have a length that would result in a natural frequency of 1 Hz for a single-magnet system. With two magnets there are multiple modes of oscillation, corresponding to the several velocity peaks which occur during each one second period, for each magnet. This makes the multiple magnet system more responsive to enclosure movements that do not match the system's natural frequency and/or are out-of-phase with the initial magnet movement. The increased responsiveness of multiple-magnet transducers with ultra low friction bearings is discussed in detail in copending patent application Ser. No. 10/077,945, entitled "Multiple Magnetic Transducer", filed on the same day as the present invention by the present applicants and also assigned to Innovative Technology Licensing, LLC, the contents of which application are hereby incorporated herein by reference. Similarly, multiple oscillation modes are produced with the multiple magnets of different field strengths which are the subject of the present invention.

Figure 5:
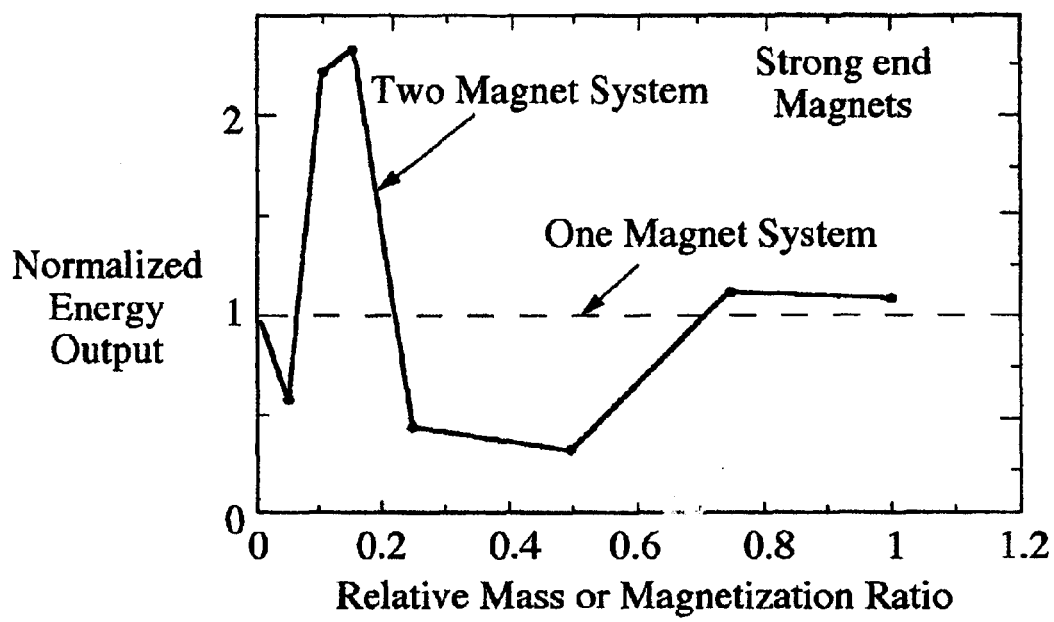
FIGS. 5 and 6 are calculated graphs relating relative energy output to relative magnet mass/magnetization differentials for strong and weak end magnet systems, respectively.
Figure 6:
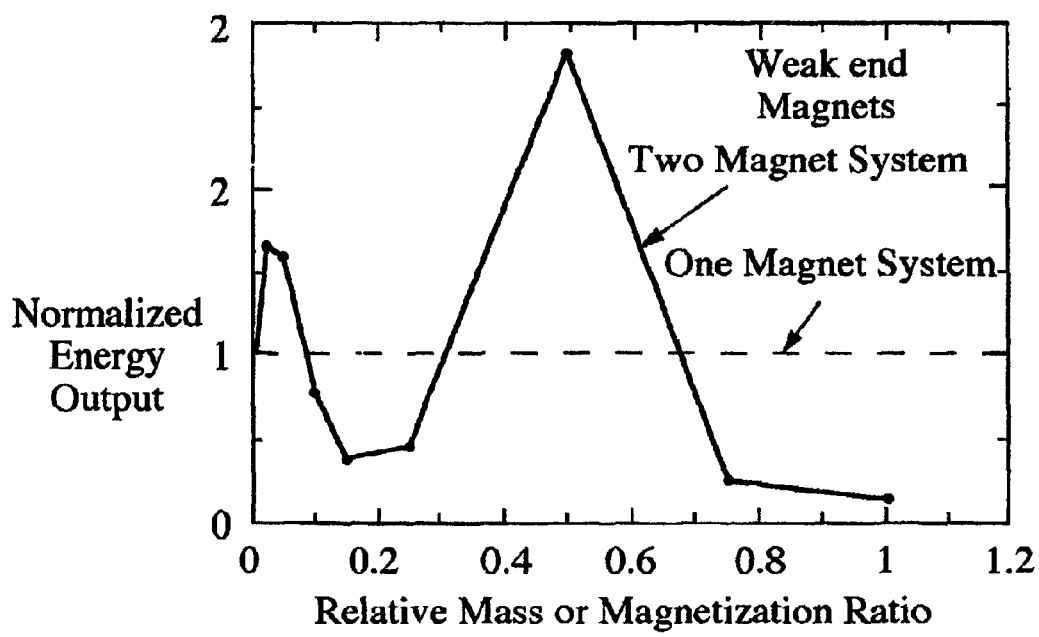

FIGS. 5 and 6 show the calculated energy outputs for two-magnet systems, normalized to the energy output for a single-magnet system, as a function of the magnet mass and magnetization ratios. FIG. 5 presents results when strong fixed end magnets (11,400 Gauss) were assumed, and FIG. 6 for weak end magnets (3,800 Gauss). The results obtained for magnets of equal magnetic material but differing masses were equivalent to the results for magnets of equal mass but differing magnetic strengths. The following assumptions were made:

Stronger magnet size: 2.54 cm. diameter, 1.27 cm. long.
Stronger magnet strength: 11,400 Gauss.
Tube length: 15.24 cm.
End magnet size: 0.95 cm. diameter, 0.635 cm. long.
Acceleration applied to tube: 1 meter/sec./sec. alternating for 0.5 sec. forward and 0.5 sec. backward, for a 1 Hz frequency (simulating an arm swing).
Frictionless system.

The two-magnet systems produced greater energy outputs than the single-magnet systems over particular ranges of mass or magnetization ratio, with the range depending upon the end magnet strength. With the strong end magnets of FIG. 5 a significantly enhanced output was calculated for ratios of about 0.075–0.2, while with the weak end magnets of FIG. 6 a significantly enhanced output was calculated for ratios of about 0.35–0.6, with a lesser peak at about 0.04. Since the applied acceleration alternated at a frequency near the single magnet system's resonant frequency, even better results could be expected at frequencies further removed from the resonant frequency, or for random inputs.

It is also significant that greater energy outputs were calculated for the two-magnet system with different magnet sizes or strengths than for a two-magnet system with equal magnet sizes or strengths (corresponding to a ratio of 1). With the system of FIG. 5 this occurred over generally the same range of ratios as when compared to a one-magnet system, while in FIG. 6 this occurred over the full ratio range.

The invention has many applications, some of which include providing power for cellular telephones, emergency transmitters and environmental sensors, and electrical generation and battery charging systems in general.

While several embodiments of the invention have been shown and described, numerous variations and alternate embodiments will occur to those skilled in the art. For example, greater numbers of magnets could be employed than in the systems illustrated, or different ultra low friction lubricants than the specific compositions mentioned could be used. Also, instead of placing the magnets inside a housing and winding the coils around the outside of the housing, the elements could be reversed with coils inside a housing and a toroidal-shaped magnet outside. Accordingly, it is intended that the invention be limited only in terms of the appended claims.

We claim:

1. A dynamic magnet system, comprising:
   a support structure, and
   a plurality of magnets oriented in polar opposition for individual movement relative to said support structure, at least some of said magnets having mutually different properties, said at least some magnets having different magnetic strengths.

2. The dynamic magnet system of claim 1, said at least some magnets having different magnetic strengths.

3. The dynamic magnet system of claim 2, said at least some magnets having substantially equal sizes.

4. The dynamic magnet system of claim 1, said at least some magnets having different sizes.

5. The dynamic magnet system of claim 4, said at least some magnets having substantially equal unit magnetic strengths.

6. The dynamic magnet system of claim 1, further comprising respective bearings establishing static coefficients of friction between said magnets and said support structure less than 0.02.

7. The dynamic magnet system of claim 1, further comprising ferrofluid bearings between said magnets and said support structure.

8. The dynamic magnet system of claim 7, said ferrofluid having a viscosity less than 10 centipoise.

9. The dynamic magnet system of claim 8, said ferrofluid comprising a light mineral oil medium mixed with isoparaffinic acid.

10. The dynamic magnet system of claim 1, further comprising a conductor oriented with respect to said support structure and magnets so that movement of said magnets induces an electrical signal in said conductor.

11. The dynamic magnet system of claim 10, said conductor comprising at least one coil wound on said support structure, said support structure being nonconductive.

12. The dynamic magnet system of claim 10, further comprising an operating system powered by said signal.

13. The dynamic magnet system of claim 1, further comprises a pair of end magnets limiting the travel of said moving magnets, said end magnets oriented in polar opposition to the nearest respective moving magnet.

14. The dynamic magnet system of claim 1, said support structure orienting said magnets for movement in a primarily horizontal direction.

15. The dynamic magnet system of claim 1, said magnets oriented for movement along a common axis.

16. The dynamic magnet system of claim 1, said system having a critical angle of displacement for said magnets from a horizontal static position of less than 1 degree.

17. The dynamic magnet system of claim 16, wherein said critical angle is less than 10 minutes.

18. The dynamic magnet system of claim 1, further comprising:
   respective bearings establishing static coefficients of friction between said magnets and said support structure less than 0.02, and
   a conductor oriented with respect to said support structure and magnets so that oscillation of said magnets in response to a movement of said support structure induces an electrical signal in said conductor, said system thereby comprising an energy harvester.

19. The energy harvester of claim 18, said at least some magnets having different magnetic strengths.

20. The energy harvester of claim 19, said at least some magnets having substantially equal sizes.

21. The energy harvester of claim 18, said at least some magnets having different sizes.

22. The energy harvester of claim 21, said at least some magnets having substantially equal unit magnetic strengths.

23. The energy harvester of claim 18, said bearings comprising a ferrofluid.

24. The energy harvester of claim 23, said ferrofluid having a viscosity less than 10 centipoise.

25. The energy harvester of claim 23, said ferrofluid comprising a light mineral oil medium mixed with isoparaffinic acid.

26. The energy harvester of claim 18, further comprising an operating system powered by said signal.

27. The energy harvester of claim 18, said support structure orienting said magnets for movement in a primarily horizontal direction.

28. The dynamic magnet system of claim 1, further comprising:
   a conductor oriented with respect to said support structure and magnets so that oscillation of said magnets in response to a movement of said support structure induces an electrical signal in said conductor, said system thereby comprising an energy harvester,
   wherein said harvester has a critical angle of displacement for said magnets from a horizontal static position of less than 1 degree.

29. The energy harvester of claim 28, wherein said magnets have different magnetic strengths.

30. The energy harvester of claim 28, wherein said critical angle is less than 10 minutes.

31. The energy harvester of claim 28, further comprising an operating system powered by said signal.

32. The dynamic magnet system of claim 1, wherein said magnets comprise:
   an even number of magnets oriented in polar opposition to individually move relative to said support structure along a common axis.

33. The dynamic magnet system of claim 32, said at least some magnets having different magnetic strengths.

34. The dynamic magnet system of claim 33, said at least some magnets having substantially equal sizes.

35. The dynamic magnet system of claim 33, said at least some magnets having different sizes.

36. The dynamic magnet system of claim 35, said at least some magnets having substantially equal unit magnetic strengths.

37. The dynamic magnet system of claim 33, further comprising respective bearings establishing static coefficients of friction between said magnets and said support structure less than 0.02.

38. The dynamic magnet system of claim 32, further comprising ferrofluid bearings between said magnets and said support structure.

39. The dynamic magnet system of claim 38, said ferrofluid having a viscosity less than 10 centipoise.

40. The dynamic magnet system of claim 38, said ferrofluid comprising a light mineral oil medium mixed with isoparaffinic acid.

41. The dynamic magnet system of claim 32, further comprising a conductor oriented with respect to said support structure and magnets so that movement of said magnets induces an electrical signal in said conductor.

42. The dynamic magnet system of claim 41, further comprising an operating system powered by said signal.

43. The dynamic magnet system of claim 32, said support structure orienting said magnets for movement in a primarily horizontal direction.

44. The dynamic magnet system of claim 32, said system having a critical angle of displacement for said magnets from a horizontal static position of less than 1 degree.

45. The dynamic magnet system of claim 44, wherein said critical angle is less than 10 minutes.

46. The dynamic magnet system of claim 1, further comprising:

respective bearings establishing ultra low static coefficients of friction less than 0.02 between said magnets and said support structure, said support structure orienting said magnets for primarily horizontal movement.

47. The dynamic magnet system of claim 46, said at least some magnets having different magnetic strengths.

48. The dynamic magnet system of claim 47, said at least some magnets having substantially equal sizes.

49. The dynamic magnet system of claim 46, said at least some magnets having different sizes.

50. The dynamic magnet system of claim 49, said at least some magnets having substantially equal unit magnetic strengths.

51. The dynamic magnet system of claim 46, said bearings comprising a ferrofluid.

52. The dynamic magnet system of claim 51, said ferrofluid having a viscosity less than 10 centipoise.

53. The dynamic magnet system of claim 51, said ferrofluid comprising a light mineral oil medium mixed with isoparaffinic acid.

54. The dynamic magnet system of claim 46, further comprising a conductor oriented with respect to said support structure and magnets so that movement of said magnets induces an electrical signal in said conductor.

55. The dynamic magnet system of claim 54, further comprising an operating system powered by said signal.

56. The dynamic magnet system of claim 1, said support structure orienting said magnets for primarily horizontal movement, wherein said system has a critical angle of displacement for said magnets from a horizontal static position of less than 1 degree.

57. The dynamic magnet system of claim 56, wherein said magnets have different magnetic strengths.

58. The dynamic magnet system of claim 56, wherein said critical angle is less than 10 minutes.

59. The dynamic magnet system of claim 56, further comprising a conductor oriented with respect to said support structure and magnets so that movement of said magnets induces an electrical signal in said conductor.

60. The dynamic magnet system of claim 59, further comprising an operating system powered by said signal.

* * * * *